May 14, 1974     L. SPEER     3,810,801

METHOD FOR PATCHING MATERIALS SUCH AS PLASTIC

Filed Dec. 27, 1972

3,810,801
METHOD FOR PATCHING MATERIALS SUCH AS PLASTIC

Lawrence Speer, Barbertown, N.J., assignor to
Vinyltron Corp., Amsterdam, N.Y.
Filed Dec. 27, 1972, Ser. No. 319,029
Int. Cl. B32b 3/20
U.S. Cl. 156—94                     6 Claims

ABSTRACT OF THE DISCLOSURE

A method for patching a damage in plastic and leather-like fabrics employs a special backing material for the damaged area. The special backing material causes the patching compound to gel in the presence of an embossing vinyl release paper covering the patch without the use of heat.

FIELD OF THE INVENTION

This invention relates to the repair of plastic and leather-like fabrics.

BACKGROUND OF THE INVENTION

A variety of methods are known for the repair of damages to plastic-like fabrics. These processes typically employ a patching compound comprising film forming ingredients in a plastisol carrier and require the use of heat to polymerize the patching compound in situ. Particularly when the damaged fabric is nonplanar or is contoured, as is the case when plastic upholstery is damaged, does it become difficult to apply heat without causing damage to the surrounding nondamaged material.

In my copending patent application Ser. No. 882,488, filed Dec. 5, 1969, now U.S. Pat. No. 3,713,926, for example, a fabric repair procedure is described where a hole in a damaged fabric is filled with patching compound and a flat hot surface is applied to a grained vinyl release paper covering the hole to form the desired grain in the surface of the compound as it gels. Heat is required to gel the patching compound because polymerization of the patching compound to form a suitable film does not occur in the absence of heat.

BRIEF DESCRIPTION OF THE INVENTION

The present invention is directed at the elimination of the heat necessary to gel the patching compound in prior art vinyl repair processes. In accordance with the present invention, a backing cloth with a solvent reactive adhesive coating forms, with the damaged area of the plastic fabric, a recess or void to be filled with a patching compound in a solvent carrier. A graining medium such as a vinyl release paper is placed over the patching compound and a flat surface is pressed against the patch. Gelling is responsive to the adhesive on the backing cloth which is operative to draw the solvent from the patching compound and the necessity of heat is obviated. The vinyl release paper under the pressure of the flat surface molds the patch surface, during the gelling step, to the grain of the undamaged fabric.

DETAILED DESCRIPTION

Figure 1:
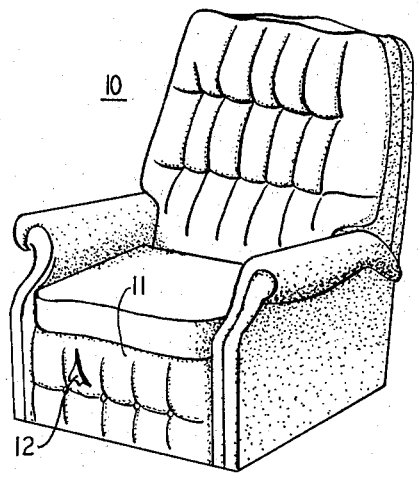
FIG. 1 is a plan view of a chair covered by a damaged plastic material to be repaired by the method of this invention.

FIG. 1 shows an illustrative upholstered chair 10, the front border 11 of which is damaged at area 12.

Figure 2:
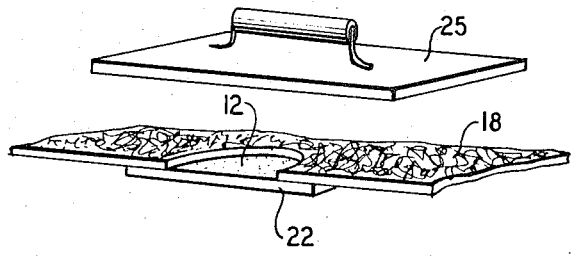
FIGS. 2 and 3 are cross sectional views of the damaged area of FIG. 1 prepared for patching and patched, respectively, in accordance with this invention.

FIG. 2 shows a cross section of the damaged area which is to be repaired by the method of this invention. The figure shows the plastic material 18 with an opening at the damaged area 12. A strong backing cloth 22 is shown inserted under the damage. A typical cloth suitable for this purpose is a rayon or, alternatively, a drill-backed cloth commonly used in the production of vinyl materials for upholstery. The backing cloth is prepared with a coating of a solvent reactive adhesive to be described more fully hereinafter.

The damaged area of the material is trimmed to remove loose fibers conveniently prior to the insertion of the coated backing cloth. Thereafter, the avoid formed by the backing cloth and the edge of the undamaged material is filled with a patching compound also to be described hereinafter.

The patch, at this juncture in the method, is covered with a graining layer 24 (see FIG. 3) which does not adhere to plastic. Either a vinyl release paper with a grain to match the grain of the undamaged fabric or a pre-formed plastic mold is suitable for this purpose. A flat surface 25 (which may be a person's finger for small damages) held against the patch area enables the vinyl release paper to emboss the surface of the patch as the patch gels, acting as a mold for the paste.

Figure 3:
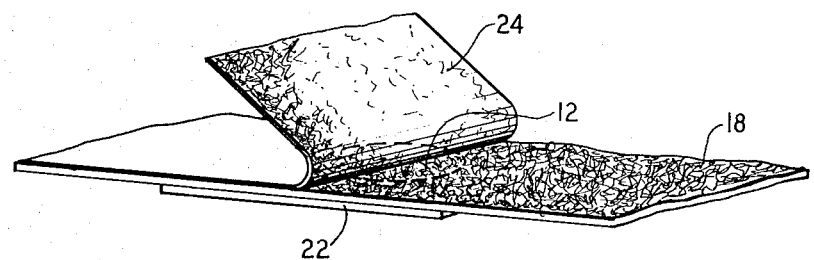

The vinyl release paper is removed after the patch is gelled leaving a virtually perfectly patched area as indicated in FIG. 3.

Figure 4:
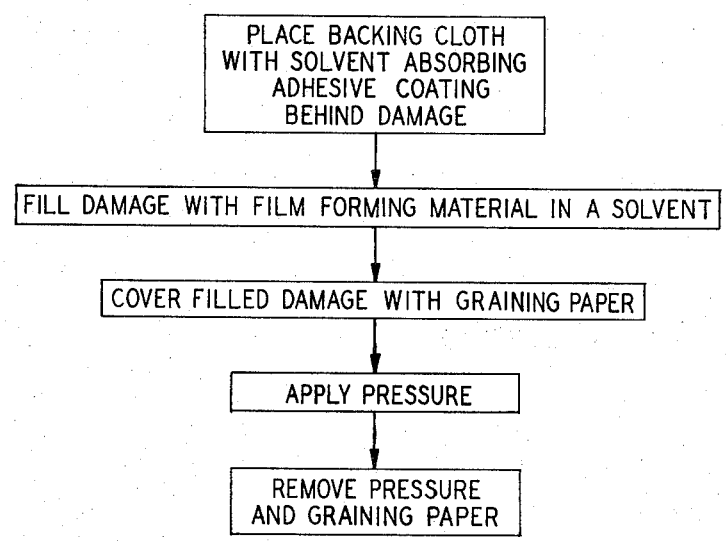
FIG. 4 is a flow diagram of the method of this invention.

The sequence of the steps of the method of this invention is shown in the flow diagram of FIG. 4. The steps are (1) place the special backing cloth beneath the damage; (2) fill the damaged area with film forming material in a solvent; (3) cover the area with graining paper; (4) apply pressure; and (5) remove the pressure and the graining paper.

The patching compound in accordance with this invention comprises a mixture of materials in a solvent carrier which forms a plastic film when the solvent is evaporated. The compound comprises, in general, a paste of a film-forming vinyl resin such as polyvinyl chloride dispersed in a plasticizer. The compound in addition, comprises a solvent such as methylisobutyl ketone or acetone which acts as a carrier. At least about 10% of the compound (by weight) is solvent to accelerate the drying operation. Any smaller percentage of solvent results in drying almost too fast to allow time for the embossing operation. One specific example of the patching compound is a clear solution of a polyvinyl chloride, 29%; a plasticizer (pthalate type), 12.2%; magnesium silicate (inert matter) 5.9%; methylisobutyl ketone, 39.6%; and an aromatic hydrocarbon, 13.3%. The polyvinyl chloride ensures that the resulting film is strong and the plasticizer ensures that the resulting film is flexible. The inert matter is merely a thickening agent and the aromatic hydrocarbon ensures that the paste is soft.

The vinyl release paper acts as a barrier to the evaporation of the solvent. Once the paper is in place covering the paste, no further gelling occurs unless the solvent is otherwise removed from the patching compound. The coated backing cloth is operative to absorb the solvent in accordance with this invention, thus eliminating any necessity for the use of heat.

Moreover, the gelling process occurs in layers. The surface of the patch gels first leaving interior regions ungelled. Consequently, even if the vinyl release paper is removed after serving its function of embossing the gelled surface area, the newly formed surface of the patch itself serves as a barrier to the further evaporation of the solvent.

Therefore, only negligible gelling occurs in the absence of a solvent absorbing material in accordance with this invention with or without the vinyl release paper.

The coating on the backing cloth reacts with the solvent in the patching compound, the solvent absorbed by the coated backing cloth in a manner which ultimately results in the bonding of the cloth firmly to the patch material and to the surrounding undamaged material. The solvent begins to be absorbed immediately. Nonetheless, during the repair procedure, additional compound is inserted into the void with a spatula until the surface of the patch is smooth and in a plane with the undamaged material. The coating on the backing material is operative to absorb the solvent, as described, until equilibrium is reached and the patch is completely gelled. This process may take hours to complete. But, the flat surface (pressure) may be removed after only a few minutes necessary to ensure proper graining, and the vinyl release paper may be left in place. The paper may be removed after some time, typically after from 15 to 45 minutes, depending on the size of the damaged area to ensure against disturbance of the newly formed surface.

Solvent reactive adhesives suitable as coatings on the backing material are available commercially. One such material comprises an acrylic resin such as an acrylic chloride acetate in a ketone solvent. The amount of solvent reactive adhesive varies depending on the manner of preparing the backing cloth. Dipping of the cloth in a solution provides more adhesive than does roller coating. But roller-coated backing cloth has been found entirely suitable for absorbing the solvent.

In the illustrative embodiment, the backing material is coated with an adhesive which becomes tacky in the presence of a solvent. When tacky, the adhesive expands allowing the solvent to pass through it. An open-knit backing cloth aids in this respect. Thus, the adhesive acts not only to absorb the solvent but to allow exposure of the solvent to air to further its evaporation. When the solvent is no longer present, the adhesive dries and shrinks resulting in a firm mechanical bond both to the patch and to the surrounding undamaged material.

It is to be understood that the material of the patching compound herein is a mixture of film forming materials in a solvent carrier, which gels only when that solvent is no longer present. The patch material, to be specific, comprises a resin powder which forms a paste in a solvent carrier such as methylisobutyl ketone or acetone. It is this solvent which is absorbed and evaporated in accordance with this invention in order to form a plastic film. Although the mixture comprises materials which are widely available, the use of a film forming mixture in a solvent carrier for the purpose of forming a patch paste for repairing leather-like films is considered new.

The patch material may be colored with, for example, vegetable coloring pigment dispersed in a ketone. But different percentages are employed for different colors. For example, for yellow, the resulting patching compound contains 6.1% by weight of the yellow pigment. For red, the percentage is 2.7%.

What has been described is considered only illustrative of the principles of this invention. Therefore, various modifications thereof can be devised by those skilled in the art in accordance with those principles within the spirit and scope of this invention as encompassed by the following claims.

What is claimed is:

1. A method for patching a damage in a plastic or leather-like fabric comprising the steps of placing a backing cloth in contact with the undamaged material surrounding the damage thus forming a void at the damage, said cloth including a coating of a solvent absorbing material, and filling said void with a patching compound comprising a mixture of materials which when gelled form a vinyl film in a solvent carrier.

2. A method in accordance with claim 1 also including the steps of covering said void with an embossing paper, and applying pressure for a time to emboss said patching material as it gels.

3. A method in accordance with claim 2 wherein said solvent absorbing material comprises a solvent reactive adhesive.

4. A method in accordance with claim 3 wherein said patching compound comprises a paste including a polyvinyl chloride resin in a solvent carrier.

5. A method in accordance with claim 4 wherein said solvent carrier is a member of a class consisting of methylisobutyl ketone and acetone.

6. A method in accordance with claim 3 wherein said solvent reactive adhesive comprises an acrylic resin in a ketone solvent system.

References Cited

UNITED STATES PATENTS

| | | | |
|---|---|---|---|
| 2,116,008 | 5/1938 | Block | 161—121 |
| 3,388,016 | 6/1968 | Murray et al. | 156—94 |

EDWARD G. WHITBY, Primary Examiner

U.S. Cl. X.R.

117—2 R; 156—209; 264—36